United States Patent
Jayanth

(10) Patent No.: US 7,866,964 B2
(45) Date of Patent: Jan. 11, 2011

(54) SENSOR FOR HERMETIC MACHINE

(75) Inventor: Nagaraj Jayanth, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 15 days.

(21) Appl. No.: 11/134,130

(22) Filed: May 20, 2005

(65) Prior Publication Data

US 2006/0275143 A1 Dec. 7, 2006

(51) Int. Cl.
*F01C 1/04* (2006.01)
*G01L 7/08* (2006.01)

(52) U.S. Cl. .............................. 418/55.1; 418/2; 73/714; 73/715

(58) Field of Classification Search ................ 418/55.1, 418/2; 73/719, 715, 730, 714, 756; 417/222.2; 361/283.1
See application file for complete search history.

(56) References Cited

U.S. PATENT DOCUMENTS

| | | | | |
|---|---|---|---|---|
| 3,417,361 A | * | 12/1968 | Heller et al. ................... | 73/777 |
| 4,469,923 A | * | 9/1984 | Charboneau .............. | 200/83 P |
| 4,551,069 A | * | 11/1985 | Gilmore ....................... | 417/13 |
| 4,712,430 A | * | 12/1987 | Wareham ..................... | 73/706 |
| 4,743,184 A | * | 5/1988 | Sumikawa et al. ............ | 418/84 |
| 4,984,468 A | * | 1/1991 | Hafner ......................... | 73/727 |
| 5,121,094 A | * | 6/1992 | Ting et al. ...................... | 337/2 |
| 5,134,888 A | * | 8/1992 | Zylka et al. .................... | 73/726 |
| 5,152,672 A | * | 10/1992 | Miyazawa ................... | 417/63 |
| 5,219,041 A | * | 6/1993 | Greve ........................... | 73/722 |
| 5,315,878 A | * | 5/1994 | Birenheide ................... | 73/727 |
| 5,503,542 A | | 4/1996 | Grassbaugh et al. | |
| 5,522,267 A | * | 6/1996 | Lewis ........................... | 73/721 |
| 5,712,428 A | * | 1/1998 | Schleiferbock .............. | 73/708 |
| 5,750,899 A | * | 5/1998 | Hegner et al. ................. | 73/756 |
| 5,756,899 A | * | 5/1998 | Ugai et al. ..................... | 73/714 |
| 5,831,170 A | * | 11/1998 | Sokn ............................ | 73/706 |
| 5,872,315 A | * | 2/1999 | Nagase et al. ................ | 73/726 |
| 5,984,645 A | * | 11/1999 | Cummings .................. | 417/307 |

(Continued)

FOREIGN PATENT DOCUMENTS

EP 0284633 A1 10/1988

(Continued)

OTHER PUBLICATIONS

Chinese Office Action dated Nov. 28, 2008, and English translation of the Chinese Office Action entitled "Text Portion of the First Office Action" provided by CCPIT Patent and Trademark Law Office on Dec. 18, 2008.

(Continued)

*Primary Examiner*—Thomas E Denion
*Assistant Examiner*—Mary A Davis
(74) *Attorney, Agent, or Firm*—Harness, Dickey & Pierce, P.L.C.

(57) ABSTRACT

A hermetic scroll compressor includes a hermetic shell through which the pressure within the shell is monitored. In one embodiment, a housing is resistance welded into an aperture extending through the shell. An oil filled pressure sensor or a dry type pressure sensor is associated with the housing. The oil filled pressure sensor extends through an aperture in the shell. The dry type pressure sensor is located on the housing outside of the shell. In another embodiment, the shell forms the diaphragm portion of the pressure sensor.

14 Claims, 2 Drawing Sheets

U.S. PATENT DOCUMENTS

| | | | |
|---|---|---|---|
| 6,224,348 B1 * | 5/2001 | Fukanuma et al. | 417/222.2 |
| 6,276,901 B1 * | 8/2001 | Farr et al. | 417/13 |
| 6,332,327 B1 * | 12/2001 | Street et al. | 62/127 |
| 6,350,630 B1 * | 2/2002 | Wildgen | 73/756 |
| 6,351,996 B1 * | 3/2002 | Nasiri et al. | 73/706 |
| 6,422,830 B1 * | 7/2002 | Yamada et al. | 417/222.2 |
| 6,435,017 B1 * | 8/2002 | Nowick et al. | 73/116 |
| 6,484,585 B1 * | 11/2002 | Sittler et al. | 73/718 |
| 6,607,367 B1 * | 8/2003 | Shibamoto et al. | 417/310 |
| 6,716,009 B2 * | 4/2004 | Sowa et al. | 418/55.1 |
| 6,883,379 B2 * | 4/2005 | Kaneko et al. | 73/720 |
| 6,923,068 B2 * | 8/2005 | Barron | 73/719 |
| 6,925,885 B2 * | 8/2005 | Ishio et al. | 73/719 |
| 7,252,005 B2 * | 8/2007 | Schulman | 73/700 |
| 7,290,989 B2 * | 11/2007 | Jayanth | 417/44.1 |
| 2002/0127120 A1 | 9/2002 | Hahn et al. | |
| 2004/0020299 A1 | 2/2004 | Freakes et al. | |
| 2005/0028585 A1 * | 2/2005 | Matsumura et al. | 73/118.2 |
| 2005/0028596 A1 | 2/2005 | Gall | |
| 2005/0217383 A1 * | 10/2005 | Tohyama et al. | 73/715 |
| 2006/0144153 A1 * | 7/2006 | Brosh | 73/715 |

FOREIGN PATENT DOCUMENTS

| | | |
|---|---|---|
| EP | 0 677 727 A2 | 10/1995 |
| JP | 02104995 A * | 4/1990 |
| JP | 2001-116638 | 4/2001 |

OTHER PUBLICATIONS

Summary of the Second Office Action received from the Mexican Institute of Industrial Property (IMPI) regarding Application No. PA/a/2006/005167. Summary provided by Goodrich, Riquelme y Asociados on Mar. 20, 2009.

Summary of the Third Office Action received from the Mexican Institute of Industrial Property (IMPI) regarding Application No. PA/a/2006/005167. Summary provided by Goodrich, Riquelme y Asociados on Sep. 3, 2009.

Partial European Search Report dated Sep. 2, 2009 regarding Application No. EP05256767.

Chinese Second Office Action dated Jan. 8, 2010 and issued in connection with a corresponding Chinese Application. Translation prepared by Unitalen Attorneys at Law.

Summary of the Fourth Office Action received from the Mexican Institute of Industrial Property (IMPI) regarding Application No. PA/a/2006/005167. Summary provided by Goodrich, Riquelme y Asociados on Mar. 25, 2010.

* cited by examiner

SENSOR FOR HERMETIC MACHINE

FIELD OF THE INVENTION

The present invention relates to a sensor for a hermetic compressor. More particularly, the present invention relates to a sensor which is designed to be welded to the hermetic shell of the Hermetic compressor.

BACKGROUND AND SUMMARY OF THE INVENTION

The utilization of hermetically sealed motor-compressor units has become increasingly prevalent in recent years in refrigeration applications wherein the motor-compressor units are employed to compress refrigerant vapor. The compressor is generally driven by an electric motor which rotates the crankshaft or driveshaft of the compressor at relatively high speeds. These hermetically sealed compressors are designed to run trouble free for the life of the motor-compressor unit.

While these hermetically sealed compressors typically do not experience any problems during their lifetime, it may be advantageous to monitor various refrigerant pressures within the refrigeration system for improved control, protection and for trouble shooting of diagnostics of both the system and the compressor should a problem occur. In an increasing number of air-conditioning or refrigeration systems, monitoring of the pressure of the refrigerant at one or several locations in the refrigeration circuit is a requirement. The pressures that are typically monitored include the suction pressure and the discharge pressure that is seen at the compressor. These pressures are traditionally sensed using a pressure sensor that is threaded into a fitting located in the suction and/or discharge refrigerant lines adjacent to the compressor. These pressure sensors are relatively expensive and unless it is essential to the proper functioning of the refrigeration system, the sensors are not installed due to financial considerations.

Assuming that a relatively inexpensive pressure sensor were made available to the refrigeration industry, most of the refrigeration systems currently being built could be improved by the incorporation of the pressure sensors. The pressure sensors could be utilized for improved control, protection and in trouble shooting of diagnostics of both the system and the compressor itself on virtually all of the refrigerant systems rather than on a limited number of systems.

The present invention provides the art with a weld-on pressure sensor for air-conditioning and refrigeration compressors. The weld-on pressure sensor is a low cost component which is easily and inexpensively welded to the shell of the compressor. The weld-on pressure sensor can be an oil filled pressure sensor, a dry type pressure sensor or a dry type pressure sensor where the shell forms the diaphragm for the pressure sensor. The weld-on pressure sensor of the present invention allows the electronics that are part of the sensing device to be placed external to the shell of the compressor and only the sensing mechanism is placed inside the hermetic shell.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
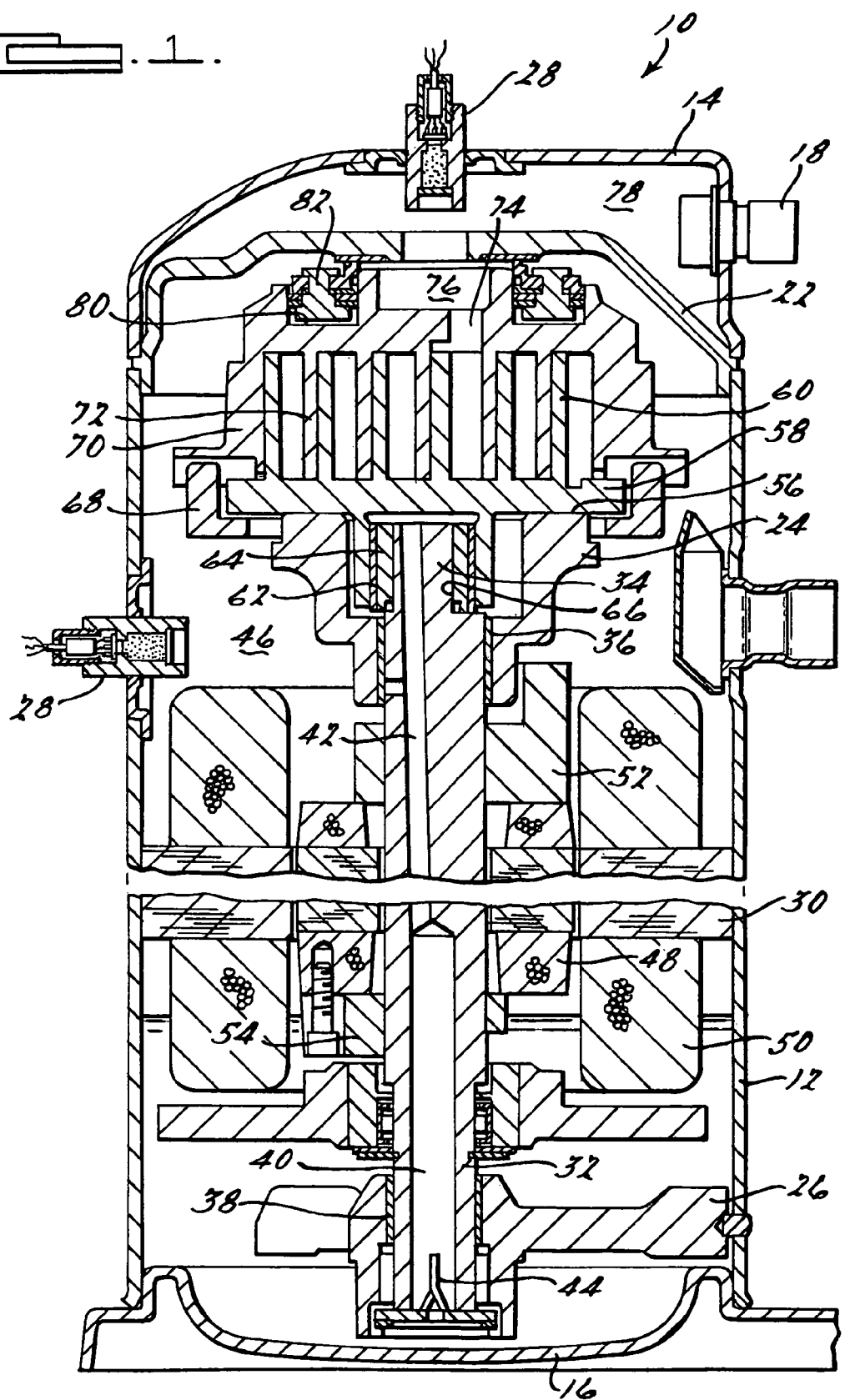
FIG. 1 is a vertical cross-sectional view through the center of a scroll type refrigeration compressor incorporating a pair of pressure sensors in accordance with the present invention.

Referring now to the drawings in which like reference numerals designate like or corresponding parts throughout the several views, there is shown in FIG. 1 a scroll compressor which incorporates the pressure sensor in accordance with the present invention which is designated generally by reference numeral 10. Compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to the shell include a transversely extending partition 22 which is welded about its periphery at the same point that cap 14 is welded to shell 12, a main bearing housing 24 which is suitably secured to shell 12, a lower bearing housing 26 also having a plurality of radially outwardly extending legs each of which is also suitably secured to shell 12 and a pressure sensor 28 welded to shell 12 and a pressure sensor 28 welded to cap 14. A motor stator 30 which is generally square in cross-section but with the corners rounded off is press fitted into shell 12. The flats between the rounded corners on the stator provide passageways between the stator and shell, which facilitate the return flow of lubricant from the top of the shell to the bottom.

A drive shaft or crankshaft 32 having an eccentric crank pin 34 at the upper end thereof is rotatably journaled in a bearing 36 in main bearing housing 24 and a second bearing 38 in lower bearing housing 26. Crankshaft 32 has at the lower end a relatively large diameter concentric bore 40 which communicates with a radially outwardly inclined smaller diameter bore 42 extending upwardly therefrom to the top of crankshaft 32. Disposed within bore 40 is a stirrer 44. The lower portion of the interior shell 12 defines suction chamber 46 which is partially filled with lubricating oil to a level slightly above the lower end of a rotor 48, and bore 40 acts as a pump to pump lubricating fluid up the crankshaft 32 and into passageway 42 and ultimately to all of the various portions of the compressor which require lubrication.

Crankshaft 32 is rotatively driven by an electric motor including stator 30, windings 50 passing therethrough and rotor 48 press fitted on the crankshaft 32 and having upper and lower counterweights 52 and 54, respectively.

The upper surface of main bearing housing 24 is provided with a flat thrust bearing surface 56 on which is disposed an orbiting scroll member 58 having the usual spiral vane or wrap 60 on the upper surface thereof. Projecting downwardly from the lower surface of orbiting scroll member 58 is a cylindrical hub having a journal bearing 62 therein and in which is rotatively disposed a drive bushing 64 having an inner bore 66 in which crank pin 34 is drivingly disposed. Crank pin 34 has a flat on one surface which drivingly engages a flat surface (not shown) formed in a portion of bore 66 to provide a radially compliant driving arrangement, such as shown in assignee's U.S. Pat. No. 4,877,382, the disclosure of which is hereby incorporated herein by reference. An Oldham coupling 68 is also provided positioned between orbiting scroll member 58 and bearing housing 24 and keyed to orbiting scroll member 58 and a non-orbiting scroll member 70 to prevent rotational movement of orbiting scroll member 58. Oldham coupling 68 is preferably of the type disclosed in assignee's copending U.S. Pat. No. 5,320,506, the disclosure of which is hereby incorporated herein by reference.

Non-orbiting scroll member 70 is also provided having a wrap 72 positioned in meshing engagement with wrap 60 of orbiting scroll member 58. Non-orbiting scroll member 70 has a centrally disposed discharge passage 74 which communicates with an upwardly open recess 76 which in turn is in fluid communication with a discharge muffler chamber 78 defined by cap 14 and partition 22. An annular recess 80 is also formed in non-orbiting scroll member 70 within which is disposed a seal assembly 82. Recesses 76 and 80 and seal assembly 82 cooperate to define axial pressure biasing chambers which receive pressurized fluid being compressed by wraps 60 and 72 so as to exert an axial biasing force on non-orbiting scroll member 70 to thereby urge the tips of respective wraps 60, 72 into sealing engagement with the opposed end plate surfaces. Seal assembly 82 is preferably of the type described in greater detail in U.S. Pat. No. 5,156,539, the disclosure of which is hereby incorporated herein by reference. Non-orbiting scroll member 70 is designed to be mounted to bearing housing 24 in a suitable manner such as disclosed in the aforementioned U.S. Pat. No. 4,877,382 or U.S. Pat. No. 5,102,316, the disclosure of which is hereby incorporated herein by reference.

The integration of sensors with compressor 10 can be approached in one of two ways. First, the sensor can be placed completely within shell 12 itself and the signal leads can be routed through shell 12 using a hermetic feed-through. This method, however, will expose the sensitive electronics that are a part of the sensor to the harsh environment within shell 12 which includes both refrigerant, lubricating oils, and extreme temperature and pressure swings. This harsh environment will affect the reliability of the sensor. Hence this is a less desirable approach.

In the second approach, the electronics that are a part of the device can be placed external to shell 12 of compressor 10 and only the sensing mechanism itself can be placed inside shell 12. This approach avoids exposing the electronics to the harsh environment in shell 12. When using this second approach, it is necessary to have the sensing mechanism in close proximity to the electronics. This is necessary because the signal (current voltage etc.) level generated by the sensing mechanism is typically very small (in the milliamperes/millivolts) and it must be fed into the amplification and processing electronics with as little lead-wire as possible. Pressure sensor 28 uses this second approach and achieves both the desired objectives of isolation and close proximity for the electronics.

Figure 2:
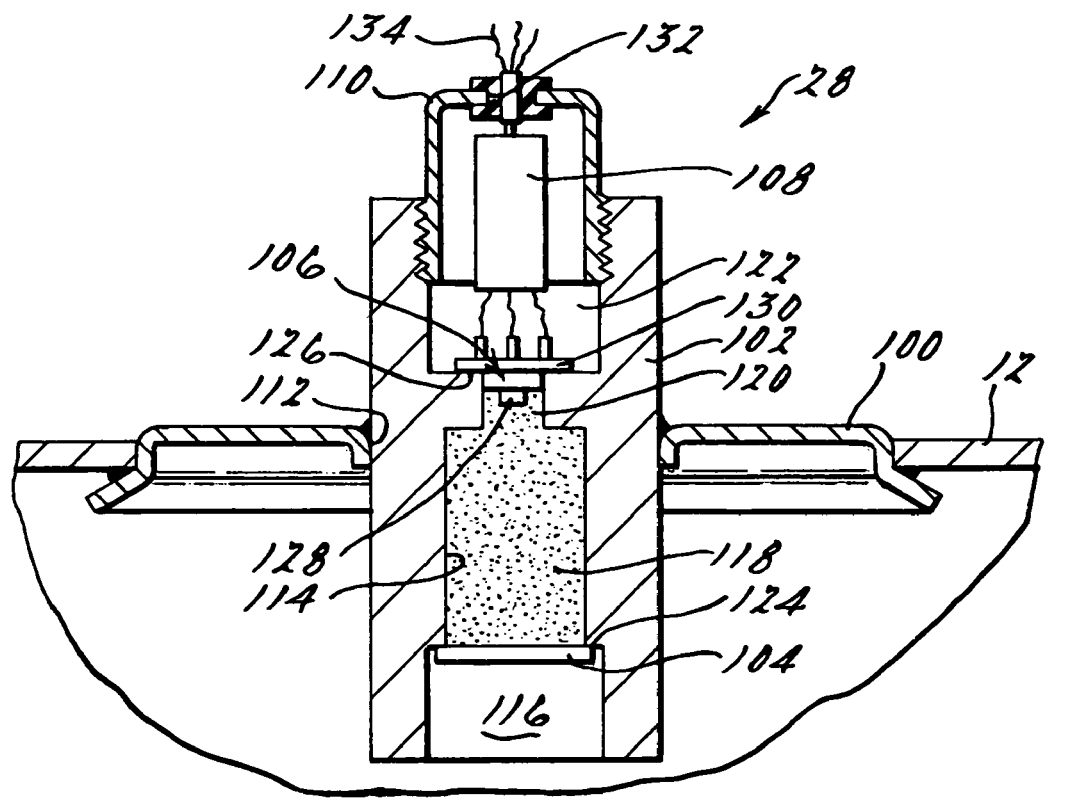
FIG. 2 is an enlarged cross-sectional view of one of the pressure sensors shown in FIG. 1.

Referring now to FIG. 2, pressure sensor 28 is shown in greater detail. Pressure sensor 28 is an oil filled pressure sensor comprising a housing 100, a body 102, a diaphragm 104, a pressure sensing device 106, signal conditioning electronics 108 and a protective member or cap 110.

Housing 100 is a cup-shaped metal housing that is designed to be resistance welded within an aperture defined by shell 12. Resistance welding is a method wherein two metal objects with carefully designed geometry are placed between two copper electrodes connected to a low voltage AC or DC power source. The two electrodes are subjected to a large force that results in squeezing the two metal pieces to be joined. Once the squeeze force reaches a required level, AC or DC voltage is applied to the electrodes. This results in a very large current (typically thousands of Amps) to flow from one electrode to the other through the metal pieces. This large current produces a high localized temperature increase at the joint. The high temperature melts the two metal pieces at the desired joint area and bonds the two metal pieces together. After a carefully controlled time, the current is switched off and the molten material is allowed to cool. The cooled area represents the welded joint of the two metal pieces. Resistance welding is a fairly common process and it is widely employed in the building of a compressor due to its low cost, its controllability and the resulting joint that is both robust and leak proof.

Body 102 is enlarged in FIG. 2 for clarity. Body 102 extends through a bore 112 extending through housing 100. Body 102 is hermetically sealed within bore 112 by welding, glass fusing or other means known in the art. Body 102 defines an internal bore 114 having an enlarged portion 116, a pocket or an intermediate portion 118, a reduced diameter portion 120 and an upper chamber or threaded portion 122. Diaphragm 104 is disposed within enlarged portion 116 and is laser welded or otherwise attached to a shoulder 124 formed between enlarged portion 116 and intermediate portion 118. Intermediate portion 118 is filled with silicone oil or any other type of fluid. Pressure sensing device 106 is laser welded or otherwise attached to a shoulder 126 formed between reduced diameter portion 120 and threaded portion 122. Pressure sensing device 106 and diaphragm 104 seal the silicone oil within intermediate portion 118. Pressure sensing device 106 includes a pressure sensing chip 128 and a hermetic feed through 130 for the electrical connection to pressure sensing chip 128.

Signal conditioning electronics 108 are located within threaded portion 122 and are electrically connected to pressure sensing chip 128 through hermetic feed through 130. Protective cap 110 is threadingly received or otherwise secured to threaded portion 122. Protective cap 110 includes an aperture 132 through which a plurality of signal out leads 134 extend from signal conditioning electronics 108, for connection to the operating system for compressor 10.

Figure 3:
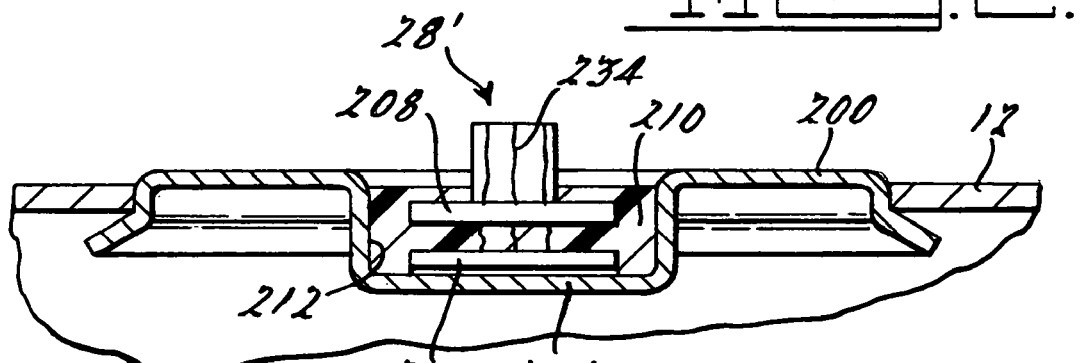
FIG. 3 is an enlarged cross-sectional view of a pressure sensor in accordance with another embodiment of the present invention.

Referring now to FIG. 3, a pressure sensor 28' is illustrated. Pressure sensor 28' is a direct replacement for pressure sensor 28. Pressure sensor 28' is a dry type of pressure sensor comprising a housing 200, a pressure sensing device 206, signal conditioning electronics 208 and a protective member in the form of potting material 210.

Housing 200 is a cup-shaped metal housing that is designed to be resistance welded to shell 12. Housing 200 defines a pocket 212 which is open to the outside of shell 12. The bottom of pocket 212 defines a diaphragm 214 formed unitary therewith. Pressure sensing device 206 is bonded or otherwise secured to diaphragm 214 within pocket 212. Signal conditioning electronics 208 are located within pocket 212 and are electrically connected to pressure sensing device 206. Potting material 310 fills pocket 212 above the position of signal conditioning electronics 208 to provide protection for pressure sensor 28'. A plurality of signal out leads 234 extend from signal conditioning electronics 208 through potting material 310 for connection to the operating system for compressor 10.

Figure 4:
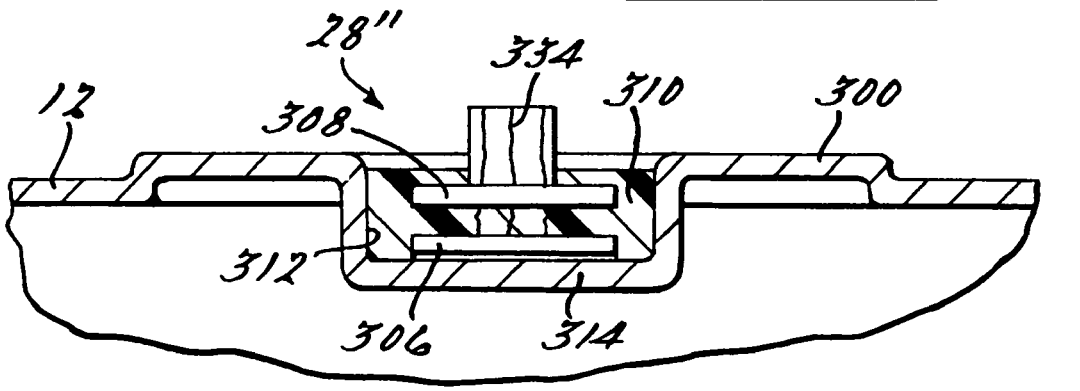
FIG. 4 is an enlarged cross-sectional view of a pressure sensor in accordance with another embodiment of the present invention.

Referring now to FIG. 4, a pressure sensor 28" is illustrated. Pressure sensor 28" is also a direct replacement for pressure sensor 28. Pressure sensor 28" is a dry type of pressure sensor comprising a housing 300, a pressure sensing device 306, signal conditioning electronics 308 and a protective potting material 310.

Housing 300 is a cup-shaped housing that is formed as a part of shell 12. By unitarily forming housing 300 as an integral part of shell 12, the resistance welding operation described above is eliminated. Housing 300 defines a pocket 312 which is open to the outside of shell 12. The bottom of pocket 312 defines a diaphragm 314 formed unitary therewith. Pressure sensing device 306 is bonded or otherwise secured to diaphragm 314 within pocket 312. Signal conditioning electronics 308 are located within pocket 312 and are electrically connected to pressure sensing device 306. Potting material 310 fills pocket 312 above the position of signal conditioning electronics 308 to provide protection for pressure sensor 28". A plurality of signal out leads 334 extend from signal conditioning electronics 308 through potting material 310 for connection to the operating system for compressor 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A compressor comprising:
a shell defining an interior volume from an outside;
an aperture formed in said shell;
a housing positioned in said aperture in said shell;
a wall of said housing defining a pocket open to said outside, and defining a diaphragm formed unitary with said housing;
a pressure-sensing device responsive to said diaphragm and disposed within said pocket;
an electronics module in communication with said pressure-sensing device and disposed within said pocket; and
a potting material disposed within said pocket surrounding said pressure-sensing device and said electronics module.

2. The compressor of claim 1, wherein said housing includes a portion extending through said aperture in said shell.

3. The compressor of claim 2, wherein said diaphragm formed unitary with said portion of said housing extending through said shell.

4. The compressor of claim 1, wherein said electronics module includes signal conditioning electronics.

5. The compressor of claim 1, wherein said housing is welded to said shell.

6. The compressor of claim 1, wherein said wall extends into said interior volume of said shell.

7. The compressor of claim 1, wherein said pocket extends into and is fluidly isolated from said interior volume of said shell.

8. A pressure sensor for a compressor having a shell defining an interior volume from an outside, the pressure sensor comprising:
a housing;
a wall of said housing defining a pocket open to said outside, and defining a diaphragm formed unitary with said housing;
a pressure-sensing device responsive to said diaphragm and disposed within said pocket;
an electronics module in communication with said pressure-sensing device and disposed within said pocket; and
a potting material disposed within said pocket surrounding said pressure-sensing device and said electronics module.

9. The pressure sensor of claim 8, wherein said electronics module includes signal conditioning electronics.

10. The pressure sensor of claim 8, wherein said housing is welded to a shell of the compressor.

11. The pressure sensor of claim 8, wherein said wall extends into an interior volume of the compressor.

12. A compressor comprising:
a shell defining an interior volume from an outside;
an aperture formed in said shell;
a compression mechanism disposed with said shell;
a drive member for actuating said compression mechanism;
a motor for driving said drive member; and
a first pressure sensor, said first pressure sensor including:
a first housing extending through said aperture and engaging said shell;
a first wall of said housing defining a first pocket open to said outside, and defining a first diaphragm unitary with said first housing;
a first pressure-sensing device responsive to said first diaphragm and disposed within said first pocket;
a first electronics module in communication with said first pressure-sensing device and disposed within said pocket; and
a first potting material disposed within said first pocket surrounding said first pressure-sensing device and said first electronics module.

13. The compressor of claim 12, further comprising a cap member and a partition plate disposed between said cap member and said shell, said interior volume between said shell and said partition plate defining a suction chamber and said interior volume between said partition plate and said cap member defining a discharge chamber.

14. The compressor of claim 13, further comprising a second pressure sensor, said second pressure sensor including:
a second housing extending through and engaging an aperture formed in said cap member;
a second wall of said second housing defining a second pocket open to said outside, and defining a second diaphragm unitary with said second housing;
a second pressure-sensing device responsive to said second diaphragm and disposed within said second pocket;
a second electronics module in communication with said second pressure-sensing device and disposed within said second pocket; and
a second potting material disposed within said second pocket surrounding said second pressure-sensing device and said second electronics module.

* * * * *